(12) United States Patent
Mizutani (10) Patent No.: US 10,969,665 B2
(45) Date of Patent: Apr. 6, 2021

(54) DRIVING APPARATUS

(71) Applicant: CANON KABUSHIKI KAISHA, Tokyo (JP)

(72) Inventor: Shoma Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/565,691

(22) Filed: Sep. 10, 2019

(65) Prior Publication Data

US 2020/0096846 A1 Mar. 26, 2020

(30) Foreign Application Priority Data

Sep. 21, 2018 (JP) .............................. JP2018-176811

(51) Int. Cl.
*G03B 19/12* (2021.01)
*G03B 9/08* (2021.01)
*G03B 17/42* (2021.01)
*H04N 5/225* (2006.01)

(52) U.S. Cl.
CPC ............... *G03B 19/12* (2013.01); *G03B 9/08* (2013.01); *G03B 17/425* (2013.01); *H04N 5/2254* (2013.01); *G03B 2217/002* (2013.01)

(58) Field of Classification Search
CPC ............ G03B 9/00; G03B 9/08; H04N 5/2254
See application file for complete search history.

(56) References Cited

U.S. PATENT DOCUMENTS

2005/0276598 A1* 12/2005 Tomatsu ................... G03B 9/32
396/357

FOREIGN PATENT DOCUMENTS

JP 2006-003459 A 1/2006
JP 2010-122518 A 6/2010

* cited by examiner

*Primary Examiner* — Minh Q Phan
(74) *Attorney, Agent, or Firm* — Venable LLP (57) ABSTRACT

A driving apparatus includes a driving source supplied with a power and configured to generate a driving force, a first cam member configured to rotate in a first rotational direction in accordance with the driving force from the driving source, a driving member configured to drive a driven member as the first cam member rotates, and a second cam member configured to contact the driving member after an electrification to the driving source is stopped so as to rotate the first cam member in a second rotational direction opposite to the first rotational direction.

6 Claims, 9 Drawing Sheets

DRIVING APPARATUS

BACKGROUND OF THE INVENTION

Field of the Invention

The present invention relates to a driving apparatus for a mirror and a shutter.

Description of the Related Art

The conventional imaging apparatus, such as a single-lens reflex camera, uses a mechanism having a motor and a cam for a mirror driving mechanism configured to switch an optical path and a charge mechanism for a shutter unit for the exposure control. The high-speed continuous imaging generates inertial forces of a power source and a transmission member, and thus there is an idle running distance of the cam from when the stop signal is output to when the cam completely stops rotating. The idle running distance varies depending on the charging speed, the temperature and humidity, or the worn conditions of components, but a control over stopping the cam in a predetermined range (stop phase range) is necessary in order to operate the cam in the correct sequence.

Japanese Patent Laid-Open No. ("JP") 2006-3459 discloses a mirror driving apparatus that includes a concave brake on a cam that adjusts an engagement with and a disengagement from a mirror, and suppresses the idle running of the cam member through a compression of the brake when the motor as a driving source is stopped.

JP 2010-122518 discloses an optical apparatus that includes a lock member on a charge member that performs a charging operation through a cam, and projects the lock member by a kinetic energy in the charge release, and suppresses the idle running of the cam.

However, the mirror driving apparatus disclosed in JP 2006-3459 needs to release the braking of the cam member by the brake using the power of the driving source, when charging resumes after charging temporarily stops, and may affect the driving efficiency. In addition, when another driving source releases the brake of the cam member so as not to affect the charging operation, the mechanism size and the power consumption become larger.

In the optical apparatus disclosed in JP 2010-122518, an action state of the imaging apparatus body may affect the lock function, such as a state in which the imaging apparatus body shakes.

SUMMARY OF THE INVENTION

The present invention provides a driving apparatus which does not apply a burden on a cam when the cam is driven, and can suppress idle running of the cam when the cam is stopped.

A driving apparatus according to one aspect of the present invention includes a driving source supplied with a power and configured to generate a driving force, a first cam member configured to rotate in a first rotational direction in accordance with the driving force from the driving source, a driving member configured to drive a driven member as the first cam member rotates, and a second cam member configured to contact the driving member after an electrification to the driving source is stopped so as to rotate the first cam member in a second rotational direction opposite to the first rotational direction.

An imaging apparatus including an image sensor configured to photoelectrically convert an object image formed by a lens apparatus and to output an electric signal, and the above driving apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention. Corresponding elements in respective figures will be designated by the same reference numerals, and a description thereof will be omitted.

First Embodiment

Figure 1A:
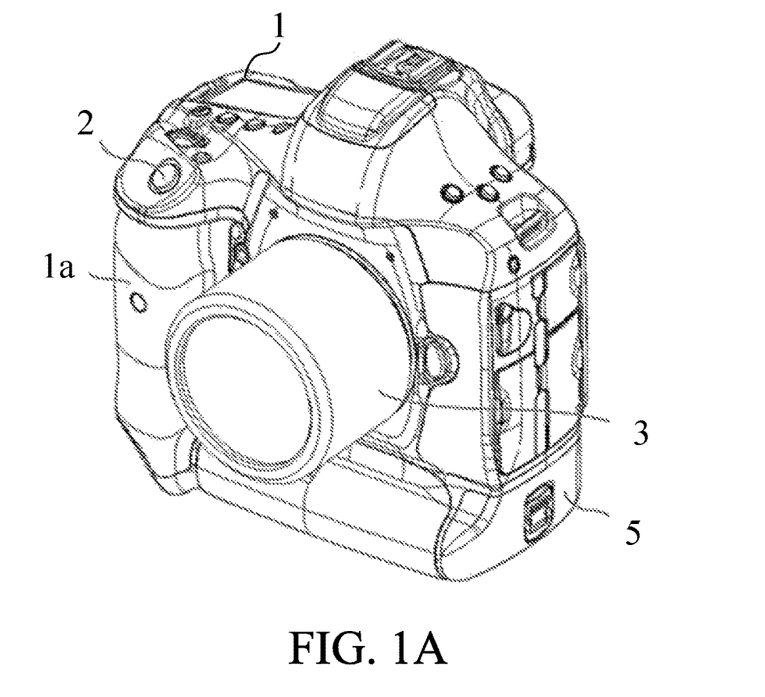
FIGS. 1A and 1B are perspective overviews of an electronic apparatus according to first and second embodiments of the present invention.
Figure 1B:
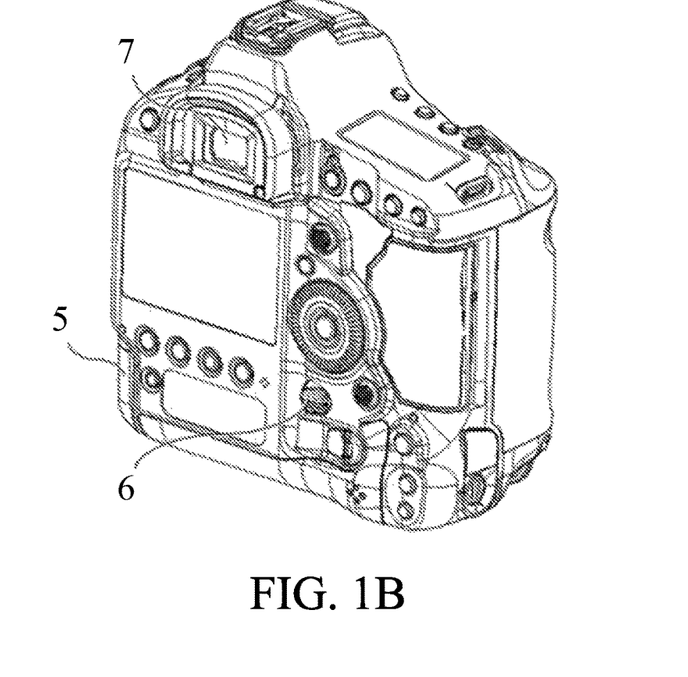
Figure 2:
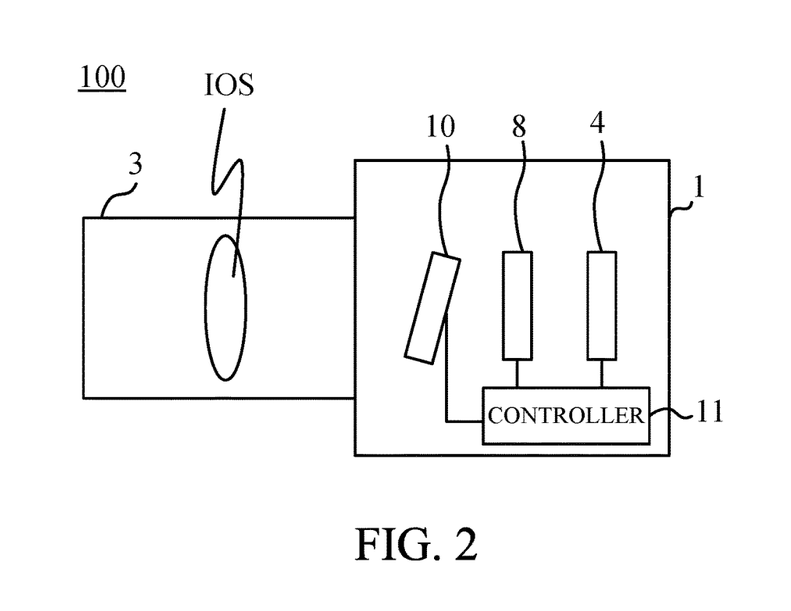
FIG. 2 is a block diagram of a digital single-lens reflex camera according to the first and second embodiments of the present invention.

Referring now to FIGS. 1A and 1B, a description will be given of a basic structure of a digital single-lens reflex camera (camera system) 100 as an illustrative electronic apparatus according to this embodiment of the present invention. FIGS. 1A and 1B are external overviews of the digital single-lens reflex camera 100. FIG. 1A is a perspective overview on the front side, and FIG. 1B is an external overview on the rear side. FIG. 2 is a schematic view of the digital single-lens reflex camera 100.

The digital single-lens reflex camera 100 includes a camera body 1, and a lens unit (lens apparatus) 3 that is attachable to and detachable from the camera body 1. Provided on the front side of the camera body 1 is a grip portion 1a for a user to stably hold the camera body 1. A shutter button 2 serves as a switch for starting imaging and is provided on the upper portion of the grip portion 1a. By pressing the shutter button 2, the light flux that has passed through an imaging optical system IOS provided in the lens unit 3 is introduced to an image sensor 4, which captures an image. The image sensor 4 photoelectrically converts an object image formed by the lens unit 3 and outputs an electric signal. A power switch 6 configured to start and stop the camera body 1 is provided on the rear side of the camera body 1. The camera body 1 has a detachable battery unit 5, and when the power switch 6 is turned on, the power is supplied from the battery unit 5 to start the operation. A viewfinder 7 is provided at the upper rear portion of the camera body 1. The viewfinder 7 projects an area to be imaged through the lens unit 3. A shutter unit 8 adjusts a light amount entering the image sensor 4. A mirror driving mechanism 10 drives the mirror unit in order to switch the optical path. A controller (control unit) 11 controls a variety of mechanisms provided inside the camera body 1.

Figure 3:
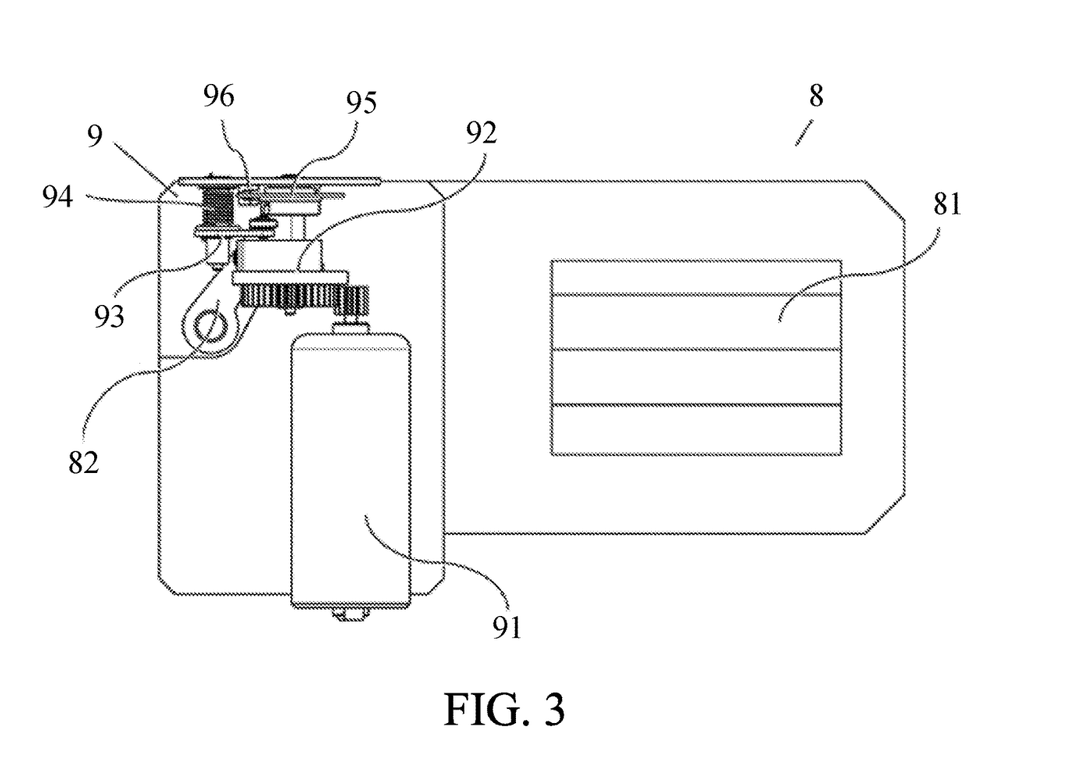
FIG. 3 is a schematic front view of a shutter unit according to the first and second embodiments.
Figure 4:
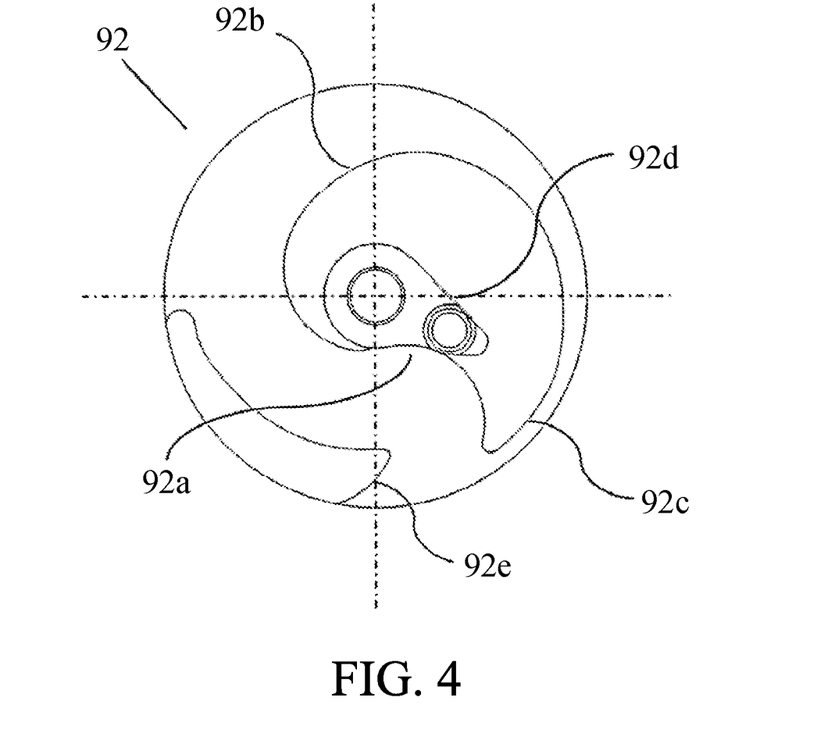
FIG. 4 is a top view of a cam gear according to the first embodiment.
Figure 5:
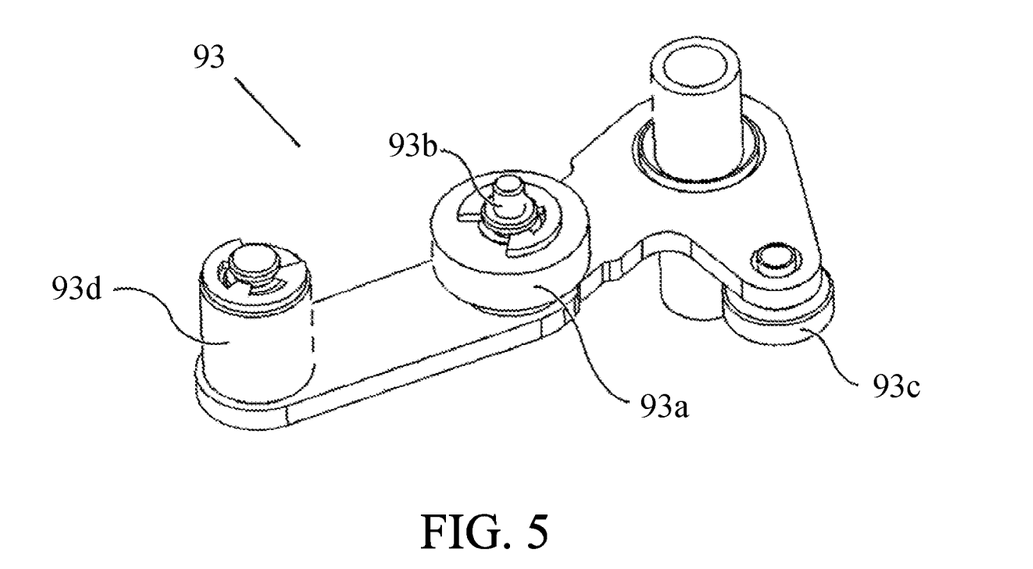
FIG. 5 is a perspective view of a charge lever according to the first embodiment.
Figure 6:
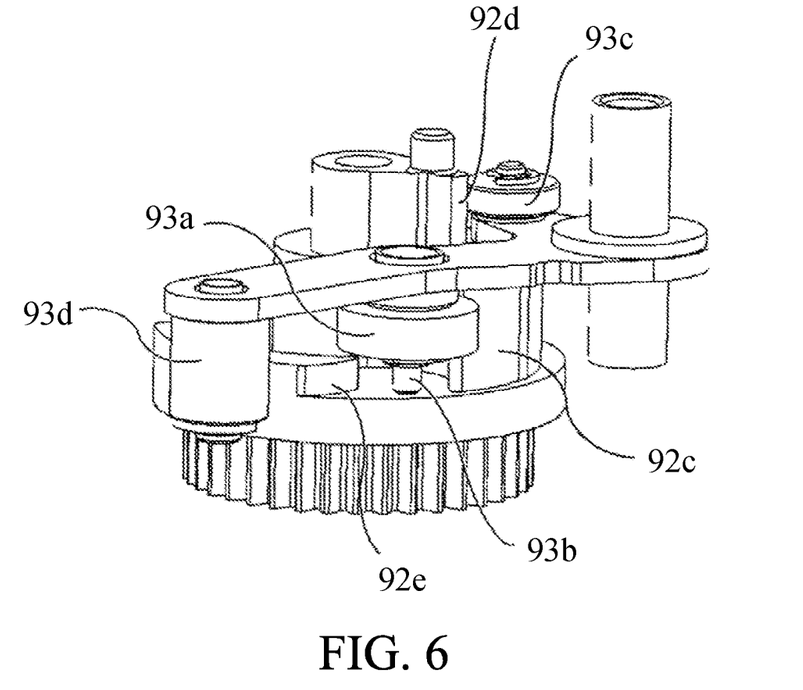
FIG. 6 illustrates a positional relationship between a cam gear and a charge lever according to the first embodiment.

Referring now to FIGS. 3 to 6, a description will be given of a structure of the shutter unit 8. FIG. 3 is a schematic front view of the shutter unit 8. FIG. 4 is a top view of a cam gear 92. FIG. 5 is a perspective view of a charge lever (driving member) 93. FIG. 6 illustrates a positional relationship between the cam gear 92 and a charge lever 93.

The shutter unit 8 includes a shutter curtain (shutter blade) 81, a set lever 82, a curtain running spring (not shown) 83, an electromagnet (not shown) 85, and a charge mechanism 9. The curtain running spring 83 opens and closes the shutter curtain 81. The electromagnet 85 controls opening and closing timings of the shutter curtain 81. The charge mechanism 9 charges the curtain running spring 83 every capture. The charge lever 93 extending from the charge mechanism 9 presses the set lever 82 to charge the curtain running spring 83.

The charge mechanism 9 includes a driving motor (driving source) 91, a cam gear 92, the charge lever 93, a charge lever spring 94, a light shielding plate 95, and a photo-interrupter 96. The driving motor 91 is supplied with the power and generates a driving force. The charge lever 93 is movable to charge the curtain running spring 83 according to this embodiment. The charge lever spring 94 biases the charge lever 93 toward the cam gear 92. The light shielding plate 95 monitors the phase of the cam gear 92.

As illustrated in FIG. 4, the cam gear 92 has a cam bottom portion 92a, a charge cam portion 92b, a cam top portion 92c, a charge lever drawing cam (induction member) 92d, and a reversely rotatable cam portion 92e.

As illustrated in FIG. 5, the charge lever 93 has a cam follower 93a, a pin shape 93b, a drawing roller 93c, and a charge roller 93d. The cam follower 93a, the drawing roller 93c, and the charge roller 93d are freely rotatably attached relative to the charge lever 93.

Referring now to FIG. 6, a description will be given of a positional relationship between the cam gear 92 and the charge lever 93. The cam follower 93a is leveled enough to contact a cam surface that includes the cam bottom portion 92a, the charge cam portion 92b, and the cam top portion 92c. The cam follower 93a does not contact the charge lever drawing cam portion 92d or the reversely rotatable cam portion 92e. The pin shape 93b is provided so as to extend coaxially with the cam follower 93a, and leveled enough to contact the reversely rotatable cam portion 92e. The drawing roller 93c is leveled enough to contact the charge lever drawing cam portion 92d. In this embodiment, while the cam follower 93a contacts the cam surface including the cam bottom portion 92a, the charge cam portion 92b, and the cam top portion 92c, the pin shape 93b is separated from the reversely rotatable cam portion 92e (or does not contact the reversely rotatable cam portion 92e). On the other hand, while the pin shape 93b contacts the reversely rotatable cam portion 92e, the cam follower 93a is separated from the cam surface that includes the cam bottom portion 92a, the charge cam portion 92b, and the cam top portion 92c (or does not contact the cam surface).

Figure 10:
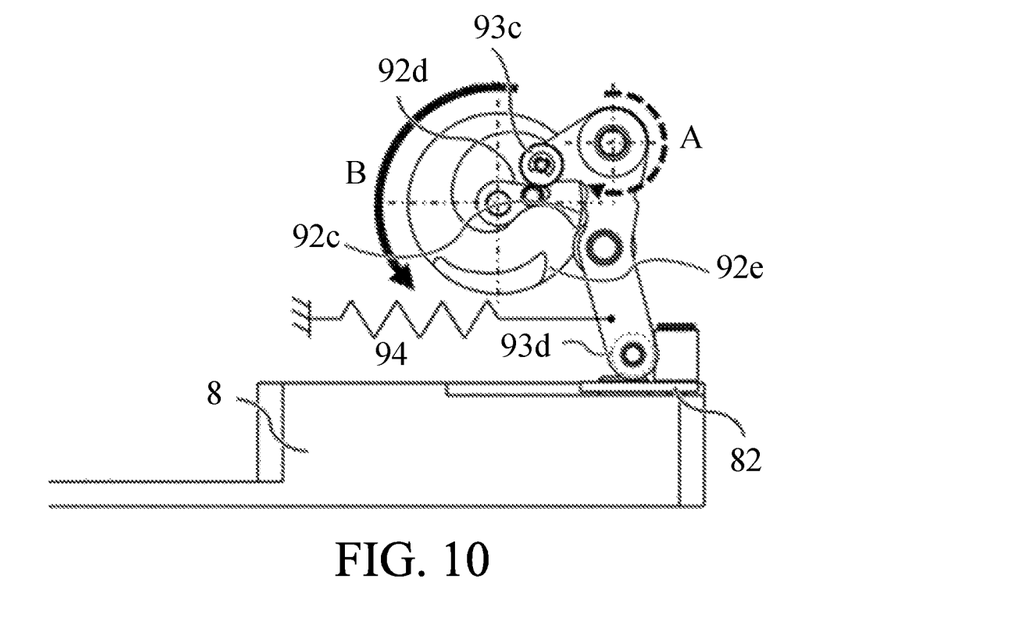
FIG. 10 is a top view showing a state in which a driving motor is completely electrified after the shutter unit is completely charged, and the cam gear starts rotating due to the inertia force according to the first embodiment.
Figure 11:
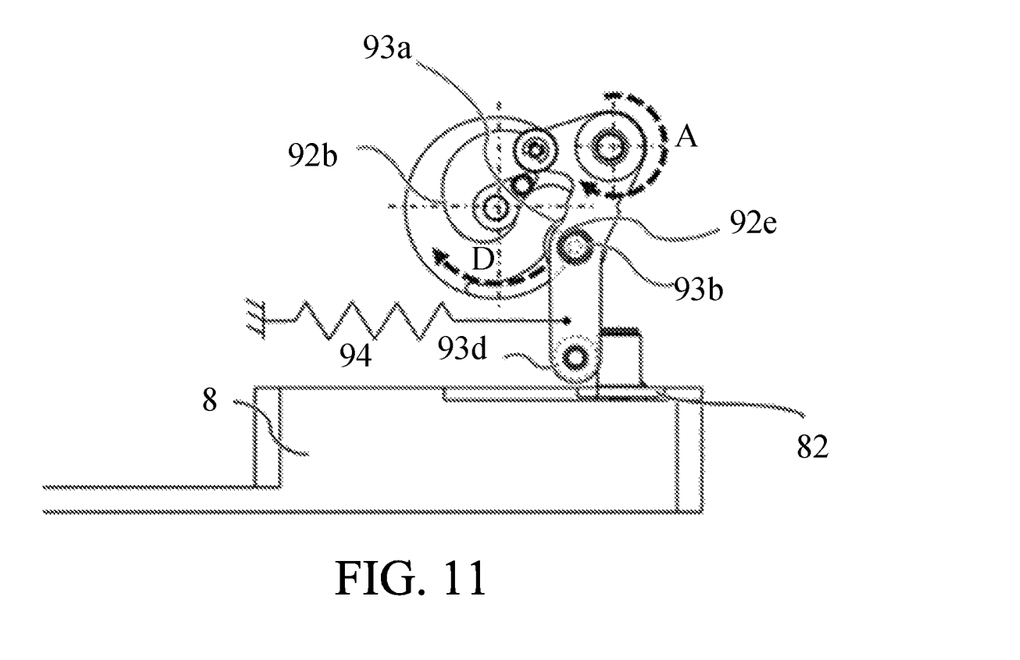
FIG. 11 is a top view showing a cam gear reversing operation in the shutter unit according to the first embodiment.
Figure 12:
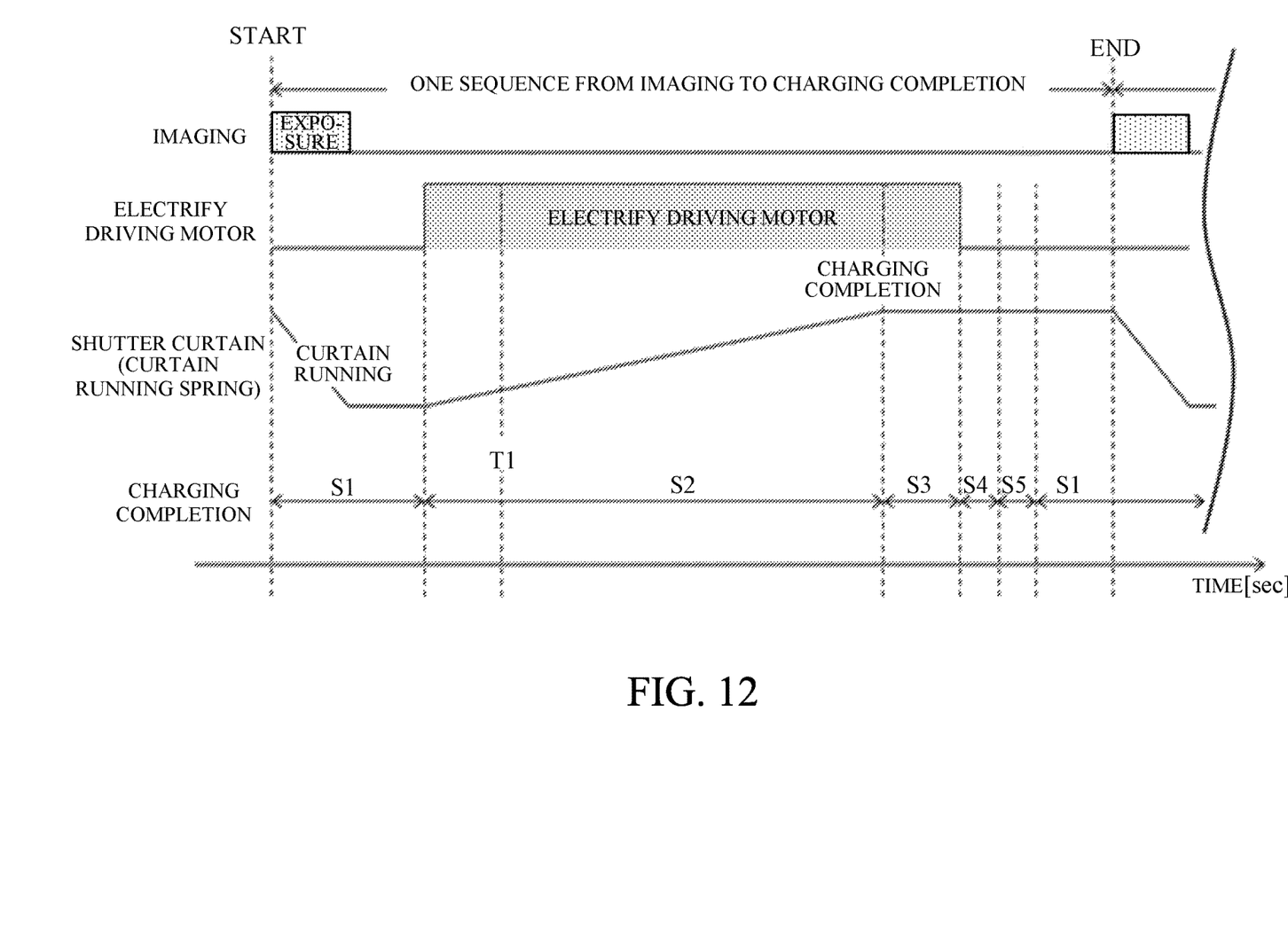
FIG. 12 is a timing chart showing a series of operations from imaging to the charge completion of the shutter unit in chronological order according to the first embodiment.

Referring now to FIGS. 7 to 12, a description will be given of the charge operation of the charge mechanism 9. FIG. 12 is a timing chart showing a series of operations from imaging to the charge completion of the shutter unit 8 in chronological order.

Figure 7:
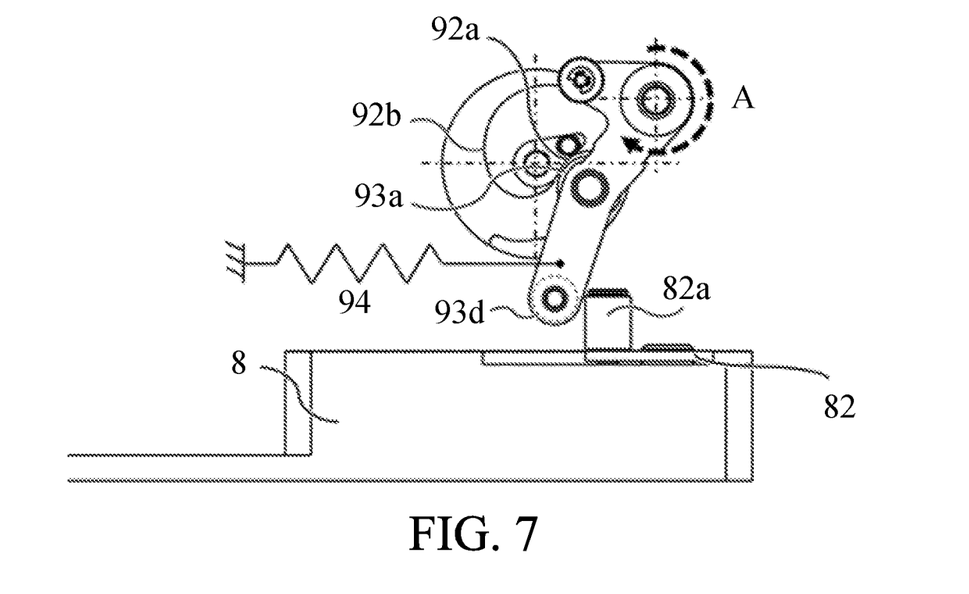
FIG. 7 is a top view showing a standby state of the shutter unit according to the first embodiment.

A description will be given of a standby state of the shutter unit 8 in an S1 section in FIG. 12. FIG. 7 is a top view showing the shutter unit 8 in the standby state. The driving motor 91 is stopped by the short brake. The cam gear 92 geared with the driving motor 91 is similarly stopped by a braking force. The charge lever 93 is stopped while the charge lever 93 is forced in an arrow A direction by the charge lever spring 94 so that the cam follower 93a contacts the cam bottom portion 92a. The charge roller 93d is separated from the set roller 82a provided on the set lever 82. The curtain running spring 83 is held by an attraction of the electromagnet 85 in a charging completion state.

When the shutter button 2 is pressed, the controller 11 transmits a shutter curtain running signal, and the energization of the electromagnet 85 is turned off. When the electromagnetic force is lost, the attraction is released, and the shutter curtain 81 is moved by the curtain running spring 83 to expose the image sensor 4. When the exposure is completed, the flow moves to the charging operation of the curtain running spring 83 in preparation for the next imaging.

Figure 8:
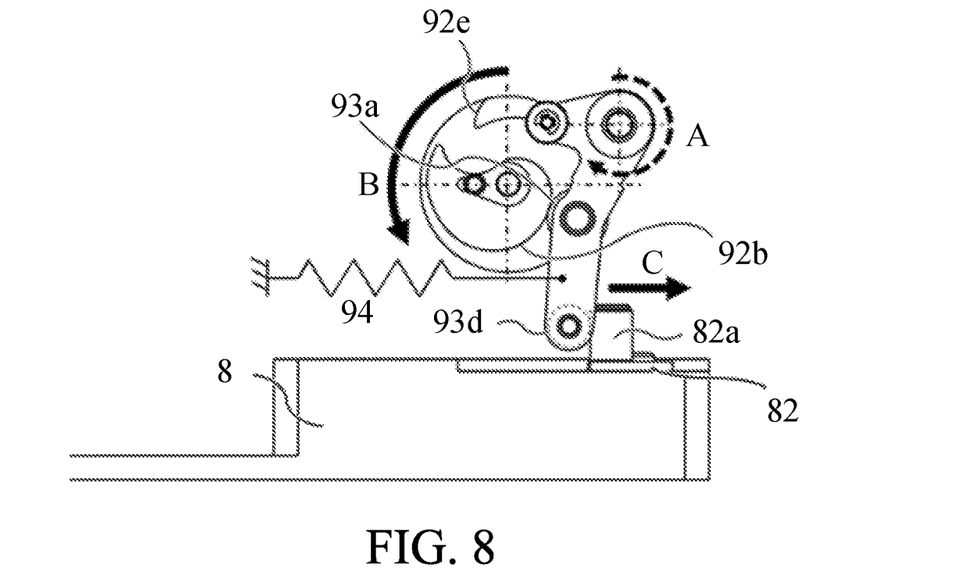
FIG. 8 is a top view showing a state immediately after the shutter unit starts a charging operation according to the first embodiment.

Next follows a description of the charge operation of the shutter unit 8 in an S2 section in FIG. 12. FIG. 8 is a top view of the shutter unit 8 immediately after the charging operation starts. The charging operation initially starts electrifying the driving motor 91, and the cam gear 92 starts rotating in an arrow B direction (first rotational direction). The cam follower 93a is pushed in a direction away from the rotation center of the cam gear 92 along the shape of the charge cam portion 92b. Thereby, the charge lever 93 rotates in an arrow C direction. Along with the rotation of the charge lever 93, the charge roller 93d starts pushing the set roller 82a in the arrow C direction. As the set lever 82 is pushed in the arrow C direction, the curtain running spring 83 starts being charged.

Figure 9:
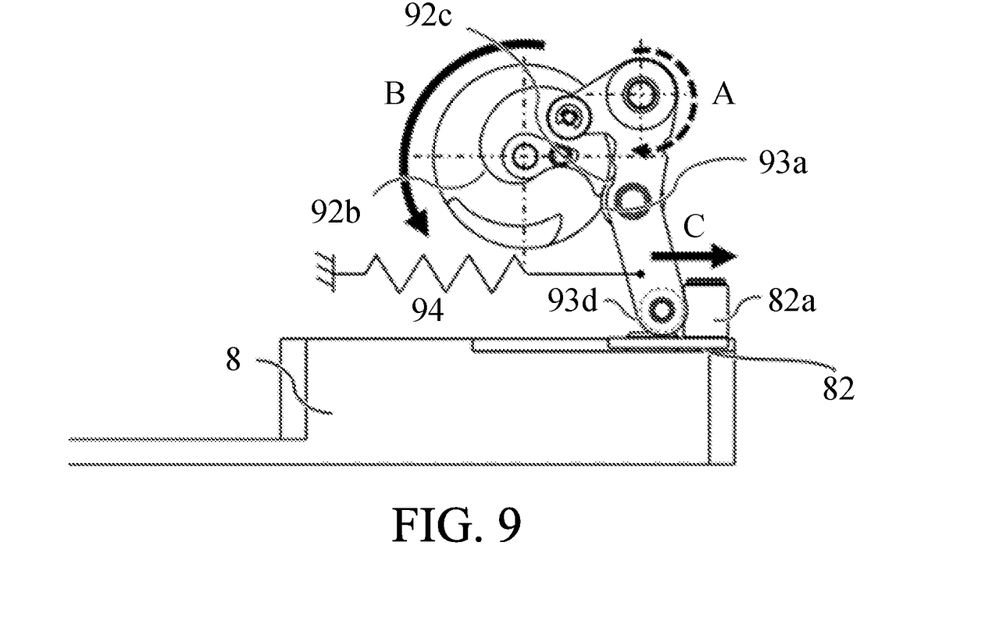
FIG. 9 is a top view showing a charging completion state of the shutter unit according to the first embodiment.

Next follows a description of the charging completion state of the shutter unit 8 in an S3 section in FIG. 12. FIG. 9 is a top view of the charging completion state of the shutter unit 8. When the driving motor 91 is continuously electrified, the cam gear 92 continues to rotate and the cam follower 93a moves to the cam top portion 92c. Now the charge lever 93 has fully pushed the set lever 82 in the arrow C direction. In this state, the curtain running spring 83 is completely charged, and the shutter curtain 81 and the curtain running spring 83 are held in the charged state by the electromagnet 85.

When the charging is completed, the energization of the driving motor 91 ends and the short brake is applied. The end of energization to the driving motor 91 can contain a small amount of power level state in which a member operable by the driving motor 91, such as the cam gear 92, does not operate, as well as a state in which the energization to the driving motor 91 is completely stopped. However, a force acts on the rotator in the driving motor 91 and the cam gear 92 to keep rotating due to the inertia. When the inertial rotation lasts for a long time, for example, passes the S1 section in FIG. 12 (the standby state of the shutter unit 8), and reaches the state of timing T1, the charge lever 93 pushes the set lever 82. Then, a variety of mechanisms in the shutter unit 8 are in the middle of charging the curtain running spring 83. If the curtain running spring 83 is opened and the shutter curtain 81 is moved in this charged state, the mechanism interferes and may cause an imaging failure or a damage. This problem is called an overrun.

Adjusting the output of the driving motor 91 and the timing of the short brake can suppress the rotational speed just before the charging completion and control stopping at a proper standby position. However, high-speed continuous imaging needs to accelerate the charging operation, and may suppress the overrun without decreasing the rotational speed of the cam gear 92.

Next follows a description of the drawing operation of the charge lever 93 after the energization of the shutter unit 8 ends in an S4 section in FIG. 12. FIG. 10 is a top view showing a state in which the energization of the driving motor 91 is completed after the charging is completed, and the cam gear 92 starts rotating by the inertia force. As described above, even if the energization of the driving motor 91 ends in the state in FIG. 9, the cam gear 92 continues to rotate in the arrow B direction by the inertial force. As a result, the cam follower 93a passes through the cam top portion 92c. Then, as illustrated in FIG. 10, the drawing roller 93c contacts the charge lever drawing cam portion 92d. The inertia force of the cam gear 92 pushes the drawing roller 93c to exert a force for rotating the charge lever 93 toward the cam bottom portion 92a. The inertia energy can be consumed by drawing the charge lever 93 by the inertia force of the cam gear 92. The cam gear 92 can be prevented from rotating in advance of the charge lever 93, and the overrun suppressing function described later can be reliably operated. Even when a large inertial force does not act during the low speed driving, the charge lever 93 is moved to the cam bottom portion 92a by the force of the charge lever spring 94 in the arrow A direction. Similarly, the set lever 82 proceeds to the phase of the standby state by the set lever spring 84.

Finally, a description will be given of the overrun suppressing function of the shutter unit 8 in an S5 section in FIG. 12. FIG. 11 is a top view of the cam gear reverse rotation operation of the shutter unit 8, and illustrates a state in which the charge lever 93 is in the middle of transitioning to the standby state or a state where the overrun suppression function is working. After the drawing operation described with reference to FIG. 10, the charge lever 93 moves to the cam bottom portion 92a. On the other hand, the cam gear 92 continues to rotate due to the inertia. As a result, as illustrated in FIG. 11, the pin shape 93b provided coaxially with the cam follower 93a contacts the reversely rotatable cam portion 92e. The reversely rotatable cam portion 92e has an arc shape inclined relative to the rotational direction. When the pin shape 93b is pushed toward the reversely rotatable cam portion 92e by the force of the charge lever spring 94 in the arrow A direction, the cam gear 92 receives a rotating force in the arrow D direction (second rotational direction) opposite to the arrow B direction. In other words, the charge lever 93 rotates the cam gear 92 in the direction opposite to that in charging so that the cam follower 93a moves to the cam bottom portion 92a by the force of the charge lever spring 94. Thereby, a force opposite to the inertial force generated by the driving of the driving motor 91 can effectively restrain the overrun. A rotational amount of the cam gear 92 in the arrow D direction caused by the reversely rotatable cam portion 92e is arbitrary, and the overrun suppressing effect can be obtained even with few rotations.

When the cam follower 93a reaches the cam bottom portion 92a, the shutter unit 8 returns to the state illustrated in FIG. 7 (standby state in the section S1 in FIG. 12). In the standby state, the pin shape 93b is separated from the reversely rotatable cam portion 92e. Hence, the charge lever 93 can perform charging again without being affected by the reversely rotatable cam portion 92e. In other words, the overrun suppression function works only in the S4 section and the S5 section in FIG. 12 and does not hinder the charging.

As described above, this embodiment provides an overrun suppressing unit that can reliably suppress the overrun without limiting the high speed rotation of the driving motor 91 and does not hinder the charging operation.

Second Embodiment

The first embodiment describes the configuration that can reliably suppress the overrun even in high-speed shutter charging operation by the effects of the charge lever drawing cam portion 92d and the reversely rotatable cam portion 92e provided in the cam gear 92. This embodiment describes a configuration that has the same effect by enlarging the reversely rotatable cam portion 92e without providing the charge lever drawing cam portion 92d in the cam gear 92. In this embodiment, those elements which are corresponding elements in the first embodiment will be designated by the same reference numerals, and a detailed description thereof will be omitted.

Figure 13:
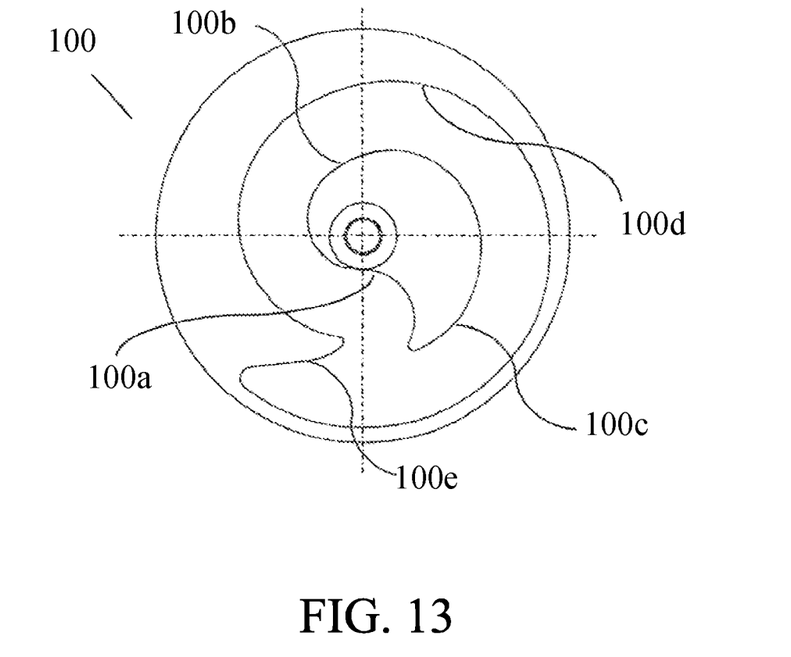
FIG. 13 is a top view of a cam gear according to the second embodiment.

FIG. 13 is a top view of the cam gear 100 according to this embodiment. The cam gear 100 includes a cam bottom portion 100a, a charge cam portion 100b, a cam top portion 100c, a wall portion 100d, and a reversely rotatable cam portion 100e.

Figure 14:
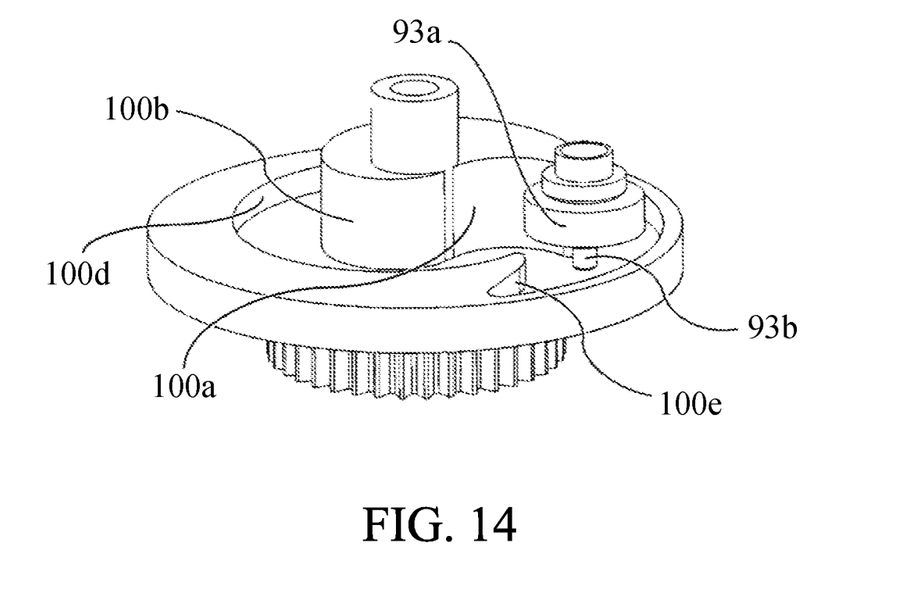
FIG. 14 illustrates a positional relationship between the cam gear and a cam follower according to the second embodiment.

FIG. 14 illustrates a positional relationship among the cam gear 100, the cam follower 93a, and the pin shape 93b. The cam follower 93a is leveled enough to contact a cam surface that includes the cam bottom portion 100a, the charge cam portion 100b, and the cam top portion 100c. The cam follower 93a does not contact the wall portion 100d or the reversely rotatable cam portion 100e. The pin shape 93b is leveled enough to contact a cam surface that includes the wall portion 100d and the reversely rotatable cam portion 100e.

Figure 15:
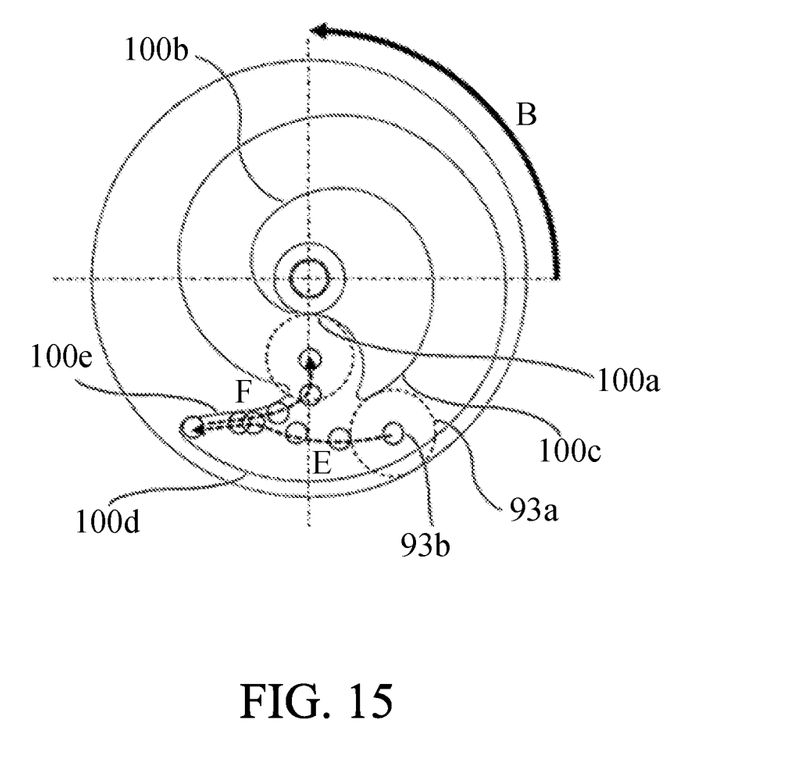
FIG. 15 is a top view showing loci of the cam follower and a pin shape when the overrun is suppressed according to the second embodiment.

Referring now to FIG. 15, a description will be given of the overrun suppressing operation according to this embodiment. FIG. 15 is a top view showing loci (loci in the overrun suppression) of the cam follower 93a and the pin shape 93b from the cam top part 100c to the cam bottom part 100a after the charging is completed and the energization of the driving motor 91 ends. Since the operation is similar to the first embodiment from the standby state in the S1 section in FIG. 12 to the charging completion state in which the energization to the driving motor 91 ends in the S1 section in FIG. 12, a description thereof will be omitted.

Similar to the first embodiment, the cam gear 100 continues to rotate in the arrow B direction due to the inertial force even after the energization to the driving motor 91 ends. When passing through the cam top portion 100c, the cam follower 93a moves to the cam bottom portion 100a by the force of the charge lever spring 94, but the pin shape 93b contacts the reversely rotatable cam portion 100e on the way. Then, when the inertial force exceeds the biasing force of the charge lever spring 94, the pin shape 93b may move up the reversely rotatable cam portion 100e in an arrow E direction. However, even if the rotation continues due to the inertial force, the rotation is forcibly stopped because the pin shape 93b reaches the area between the wall 100d and the reversely rotatable cam portion 100e. Thereafter, the pin shape 93b presses the reversely rotatable cam portion 100e by the force of the charge lever spring 94, rotates the cam gear 100 in a direction opposite to the rotational direction (arrow B direction) for the charging similar to the first embodiment, and moves to the cam bottom portion 100a along an arrow F.

As described above, this embodiment can reliably prevent the overrun of the cam gear 100 without the charge lever drawing cam portion 92d and the drawing roller 93c described in the first embodiment, and can surely bring the pin shape 93b into contact with the reversely rotatable cam portion 100e. In other words, this embodiment can acquire the effect similar to that of the first embodiment, and provide a smaller size and a lower cost than the first embodiment.

This embodiment applies the present invention to the charge mechanism for the shutter unit 8 to drive the shutter curtain 81 that serves as a driven member, but the present invention is not limited to this embodiment. The present invention is applicable to, for example, the mirror driving mechanism 10 to drive the mirror unit that serves as the driven member.

This embodiment provides the cam bottom portion 92a, the charge cam portion 92b, the cam top portion 92c, and the reversely rotatable cam portion 92e to the cam gear 92, but the present invention is not limited to this embodiment. For example, the cam bottom portion 92a, the charge cam portion 92b, and the cam top portion 92 may constitute a first cam member, and the reversely rotatable cam portion 92e may constitute a second cam member different from the first cam member. In addition, the charge lever retraction cam portion 92d may constitute a third cam member different from the first and second cam members. Then, the first to third cam members are configured to rotate coaxially.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-176811, filed on Sep. 21, 2018, which is hereby incorporated by reference herein in its entirety.

What is claimed is:

1. A driving apparatus comprising:
   a driving source supplied with a power and configured to generate a driving force;
   a first cam member configured to rotate in a first rotational direction in accordance with the driving force from the driving source;
   a driving member configured to drive a driven member as the first cam member rotates; and
   a second cam member configured to contact the driving member after an electrification to the driving source is stopped so as to rotate the first cam member in a second rotational direction opposite to the first rotational direction,
   wherein the driving member while contacting the first cam member is separated from the second cam member, and the driving member while contacting the second cam member is separated from the first cam member.

2. The driving apparatus according to claim 1, wherein the first cam member and the second cam member coaxially rotate.

3. The driving apparatus according to claim 1, further comprising an induction member configured to induct the driving member so that the driving member contacts the second cam member when the first cam member and the drive member are separated from each other.

4. The driving apparatus according to claim 3, wherein the induction member is a third cam member configured to rotate coaxially with the first cam member.

5. The driving apparatus according to claim 1, wherein the driving member is a shutter blade or a mirror unit provided in an imaging apparatus.

6. An imaging apparatus comprising:
   an image sensor configured to photoelectrically convert an object image formed by a lens apparatus and to output an electric signal; and
   a driving apparatus,
   wherein the driving apparatus includes:
   (1) a driving source supplied with a power and configured to generate a driving force;
   (2) a first cam member configured to rotate in a first rotational direction in accordance with the driving force from the driving source;
   (3) a driving member configured to drive a driven member as the first cam member rotates; and
   (4) a second cam member configured to contact the driving member after an electrification to the driving source is stopped so as to rotate the first cam member in a second rotational direction opposite to the first rotational direction,
   wherein the driving member while contacting the first cam member is separated from the second cam member, and the driving member while contacting the second cam member is separated from the first cam member.

* * * * *